US008411671B1

(12) United States Patent
Bloomcamp et al.

(10) Patent No.: US 8,411,671 B1
(45) Date of Patent: Apr. 2, 2013

(54) LOSS ADJUSTMENT CONTROL IN A TANDEM MEDIA COMMUNICATION NETWORK

(75) Inventors: Eric Michael Bloomcamp, Olathe, KS (US); Russell E. Huntsman, Overland Park, KS (US); Pierce Andrew Gorman, Lee's Summit, MO (US); Robert E. Geis, Lenexa, KS (US); Eric C. English, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1042 days.

(21) Appl. No.: 12/409,686

(22) Filed: Mar. 24, 2009

(51) Int. Cl.
*H04L 12/66* (2006.01)
(52) U.S. Cl. .................... 370/352; 370/465; 709/226
(58) Field of Classification Search .................. 370/252, 370/352–356, 465, 468, 493–494, 329; 709/226
See application file for complete search history.

(56) References Cited

U.S. PATENT DOCUMENTS

| | | | |
|---|---|---|---|
| 6,798,786 B1 * | 9/2004 | Lo et al. ........................ | 370/468 |
| 7,430,179 B2 * | 9/2008 | Towns-von Stauber et al. ............................ | 370/252 |
| 7,606,164 B2 * | 10/2009 | Anandakumar et al. ....... | 370/252 |
| 7,688,754 B2 * | 3/2010 | Williams ........................ | 370/253 |
| 7,940,685 B1 * | 5/2011 | Breslau et al. ................. | 370/251 |
| 8,305,919 B2 * | 11/2012 | Johns et al. .................... | 370/252 |
| 2007/0286179 A1 * | 12/2007 | Freyman et al. ............... | 370/356 |
| 2008/0227477 A1 * | 9/2008 | Dayal et al. .................... | 455/522 |
| 2010/0116409 A1 * | 5/2010 | Yamamoto ..................... | 156/73.1 |
| 2010/0128613 A1 * | 5/2010 | Liu et al. ........................ | 370/252 |
| 2011/0116409 A1 * | 5/2011 | Jeong et al. .................... | 370/252 |

OTHER PUBLICATIONS

Non-final Office Action issued in U.S. Appl. No. 12/018,728 on Mar. 24, 2011, 11 pages.

* cited by examiner

*Primary Examiner* — Kevin Mew

(57) ABSTRACT

An originating device coupled to an originating network requests a media call to a terminating device coupled to a terminating network. In between the originating and terminating networks, a tandem network receives a signaling message for the media call transferred by the originating network. The tandem network retrieves and processes numbers for the originating device and the terminating device from the signaling message to determine a loss adjustment for the media call and to select the originating device or the terminating device to make the loss adjustment. The tandem network transfers a loss instruction indicating the loss adjustment to the originating network or the terminating network for delivery to the selected device. The selected device receives the loss instruction and responsively makes the loss adjustment.

18 Claims, 5 Drawing Sheets

LOSS ADJUSTMENT CONTROL IN A TANDEM MEDIA COMMUNICATION NETWORK

TECHNICAL BACKGROUND

A single media session may now utilize several different media networks. For example, a single Voice Over Internet Protocol (VOIP) call may span three or more different VOIP networks. Given the number of media networks in existence, the number of possible combinations of media networks handling a single call is quite large.

The media networks and media devices typically apply loss to the media, but these networks and devices have different loss characteristics. Thus, the combinations of loss characteristics that can possibly be applied to a single media session is rather complex. Unfortunately, some of these combinations of loss characteristics may result in poor media quality. For example, if the loss characteristics of the VOIP networks handling a VOIP call do not properly balance, then the audio quality of the VOIP call may suffer as a result.

OVERVIEW

An originating device coupled to an originating network requests a media call to a terminating device coupled to a terminating network. In between the originating and terminating networks, a tandem network receives a signaling message for the media call transferred by the originating network. The tandem network retrieves and processes numbers for the originating device and the terminating device from the signaling message to determine a loss adjustment for the media call and to select the originating device or the terminating device to make the loss adjustment. The tandem network transfers a loss instruction indicating the loss adjustment to the originating network or the terminating network for delivery to the selected device. The selected device receives the loss instruction and responsively makes the loss adjustment.

DETAILED DESCRIPTION

Figure 1:
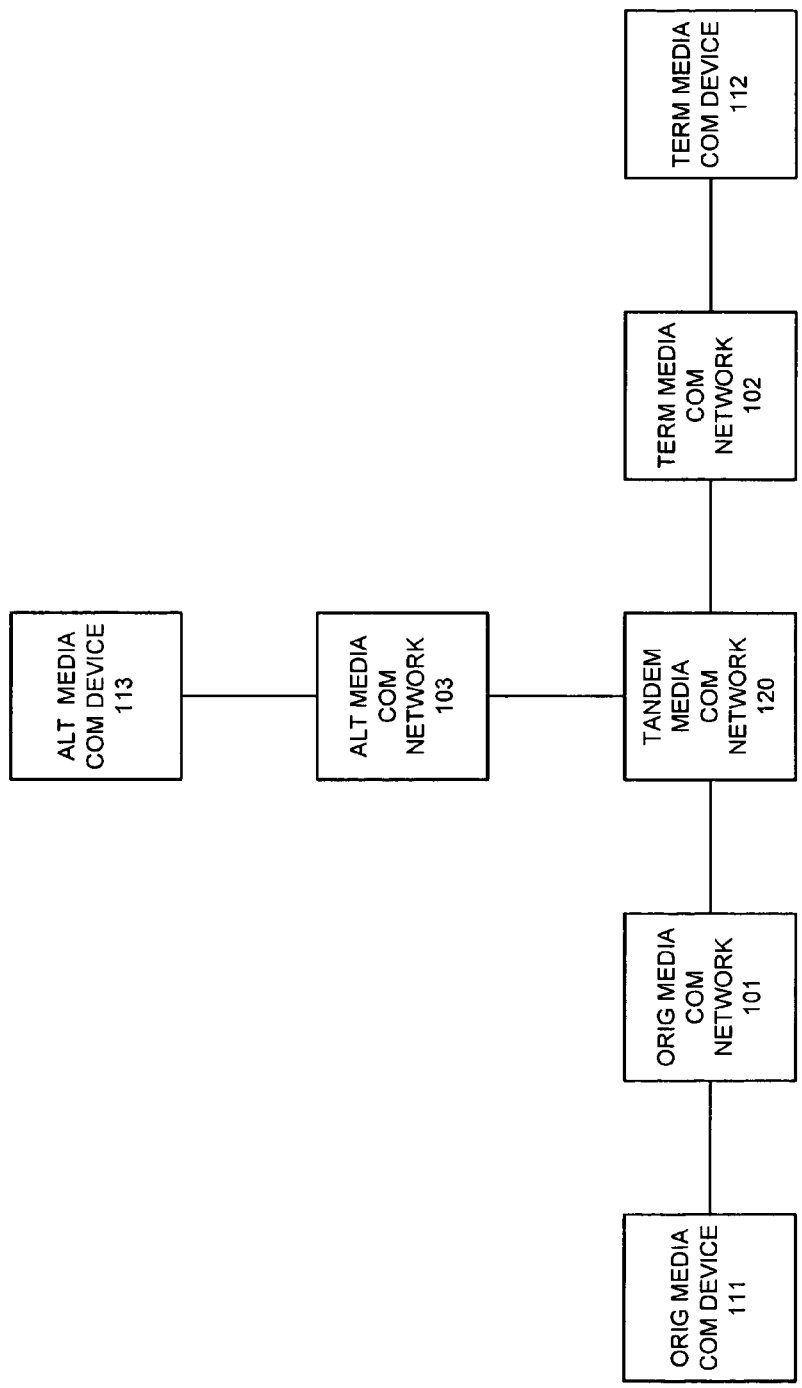
FIG. 1 illustrates a tandem media communication network.

FIG. 1 illustrates tandem media communication network 120. Tandem media communication network 120 includes call processing system 122 and routing system 123. Tandem media communication network 120 communicates with originating media communication network 101 and terminating media communication network 102. Originating media communication network 101 is linked to and associated with originating media communication device 111. Terminating media communication network 102 is linked to and associated with terminating media communication device 113.

Figure 2:
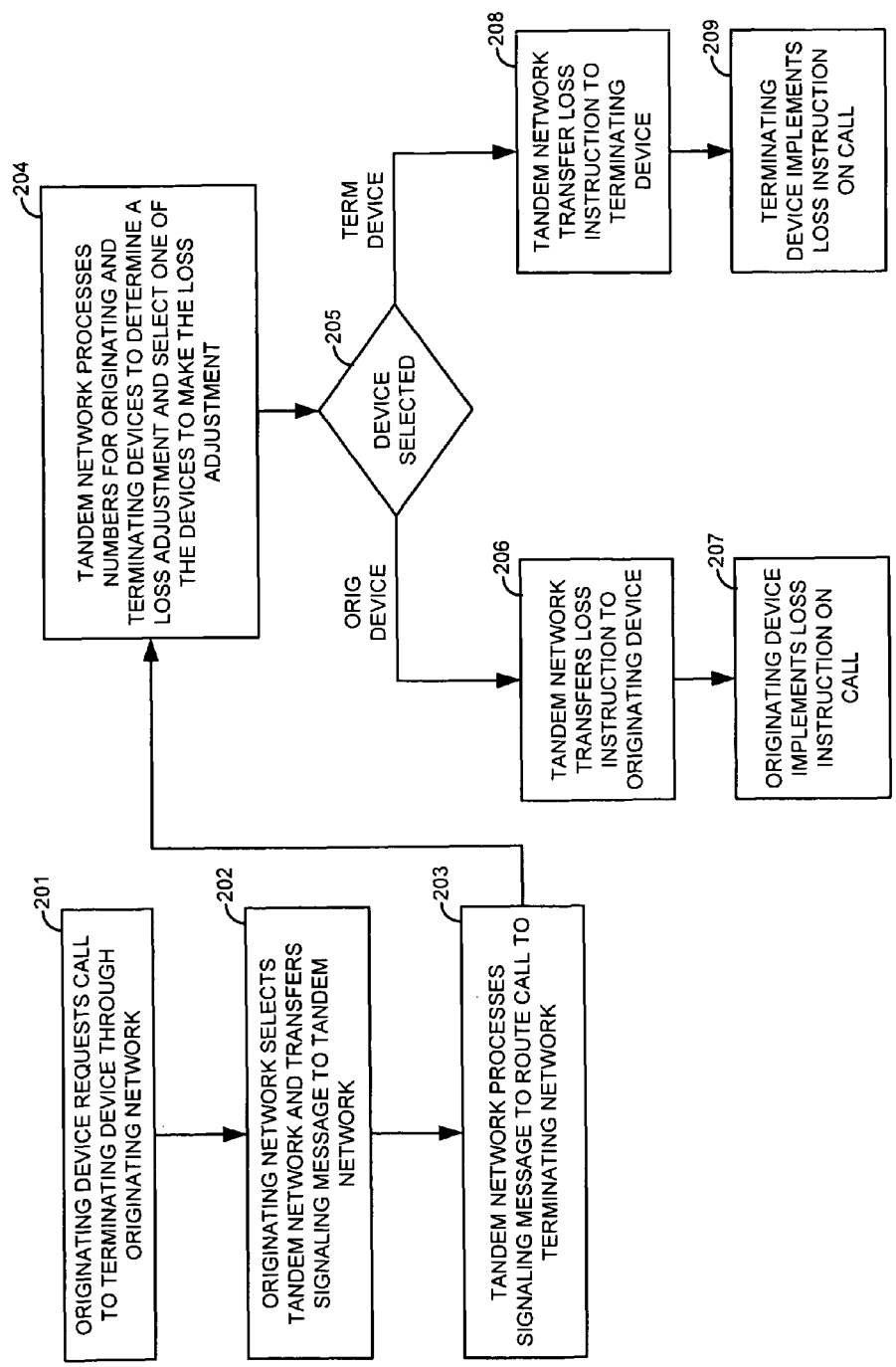
FIG. 2 illustrates the operation of the tandem media communication network.

FIG. 2 illustrates the operation of tandem media communication network 120. Originating media communication device 111 requests a media call to terminating media communication device 112 (201). The media call comprises a simplex or duplex exchange of voice communications, an audio or video upload or download, a push-to-talk communication, an audio or video conference, a media message, or some other media transfer. The call request is placed to originating media communication network 101.

Originating media communication network 101 processes the request to select tandem media communication network 120 to handle the call and transfers a signaling message for the call to tandem media communication network 120 (202). In tandem network 120, call processing system 122 receives and processes the signaling message to route the call from originating media communication network 101 to terminating media communication network 102 (203). Routing includes the transfer signaling messages with routing information to media communications networks 101-102 and possibly to routing system 123.

In tandem network 120, call processing system 122 processes a first number for originating media communication device 111 and a second number for the terminating media communication device 112 to determine a loss adjustment for the media call and to select one of media communication devices 111-112 to make the loss adjustment (204). The first number and the second number are typically retrieved from the signaling message and could be a telephone number, email address, internet address, user ID, or some other data that associates media communication devices 111-112 with their respective communication networks. The numbers may use alphanumeric characters and other symbols.

If originating media communication device 111 is selected to make the loss adjustment (205), then call processing system 122 transfers a loss instruction indicating the loss adjustment to originating media communication network 101 for delivery to selected communication device 111 (206), and selected device 111 responsively makes the loss adjustment for the media call (207). If terminating media communication device 112 is selected to make the loss adjustment (205), then call processing system 122 transfers a loss instruction indicating the loss adjustment to terminating media communication network 102 for delivery to selected communication device 112 (208), and selected device 112 responsively makes the loss adjustment for the media call (209).

The loss instructions may be included in the signaling messages that are used for routing as discussed above. To perform the loss adjustment, the selected one of the media communication devices 111-112 typically controls internal signal processing circuitry to adjust the decibels of loss applied to the audio portion of the call. Communication devices 111-112 could use other techniques to perform the loss adjustment.

Referring back to FIG. 1, one or both of media communication devices device 111-112 transfer media communications for the media call to their respective communication network 101-102 for transfer to routing system 123. Routing system 123 transfers the media communications for the media call between originating network 101 and terminating network 102. Originating network 101 and terminating network 102 then transfer any routed media communications they receive for the media call to their respective media communication devices 111-112. During the call, the selected one of media communication devices 111-112 applies loss to the media communications in accord with the loss instruction.

Call processing system 122 comprises a computer system that has processing circuitry, communication interfaces, memory, and software. Call processing system 122 may include a soft-switch, signaling links, service control point, media application server, switch processor, media gateway, or some other signaling processor—including combinations thereof. Routing system 123 comprises processing circuitry, communication interfaces, memory, and software. Routing system 123 may include routers, media servers, communication links, gateways, border controllers, switches or some other media communication apparatus—including combinations thereof.

Call processing system 122 and routing system 123 could be discreet systems or be wholly or partially integrated. For example, the operations of call processing system 122 could be integrated into internet protocol routers that comprise routing system 123, and the signaling messages could be integrated into the internet messages handled by the routers— possibly the same internet messages that carry the media content. In an alternative example, the operations of call processing system 122 could be integrated into a soft switch and control database, and routing system 123 could include routers, gateways and border controllers.

Tandem media communication network 120 communicates with originating media communication network 101, terminating media communication network 102, and alternative media communication network 103. These communications include user media and signaling data. The communications may traverse various media types including metal, glass, air, or some other transport apparatus. The communications may use various formats including internet, Ethernet, time division multiplex, wireless interoperability for microwave access, long term evolution, or some other media communication protocol. The communications may use various signaling protocols, such as session initiation protocol, signaling system seven, internet control messaging, media packet overhead data, or some other type of communication signaling. Tandem media communication network 120 may be directly linked to media communication networks 101-103, or they may be linked through intermediate devices, systems, and networks.

Media communication networks 101-103 could be configured like network 120, or they could use other media transfer configurations. Media communication devices 111-113 could be telephones, computers, music players, video players, wireless transceivers, audio servers, video servers, or some other media transfer apparatus. Originating media communication network 101 is linked to and associated with originating media communication device 111. Terminating media communication network 102 is linked to and associated with terminating media communication device 113. Alternative media communication network 103 is linked to and associated with alternative media communication device 113. These links may use various media, formats, and signaling. These links may be direct or include intermediate devices, systems, or networks. The association is typically a communication service agreement.

Figure 3:
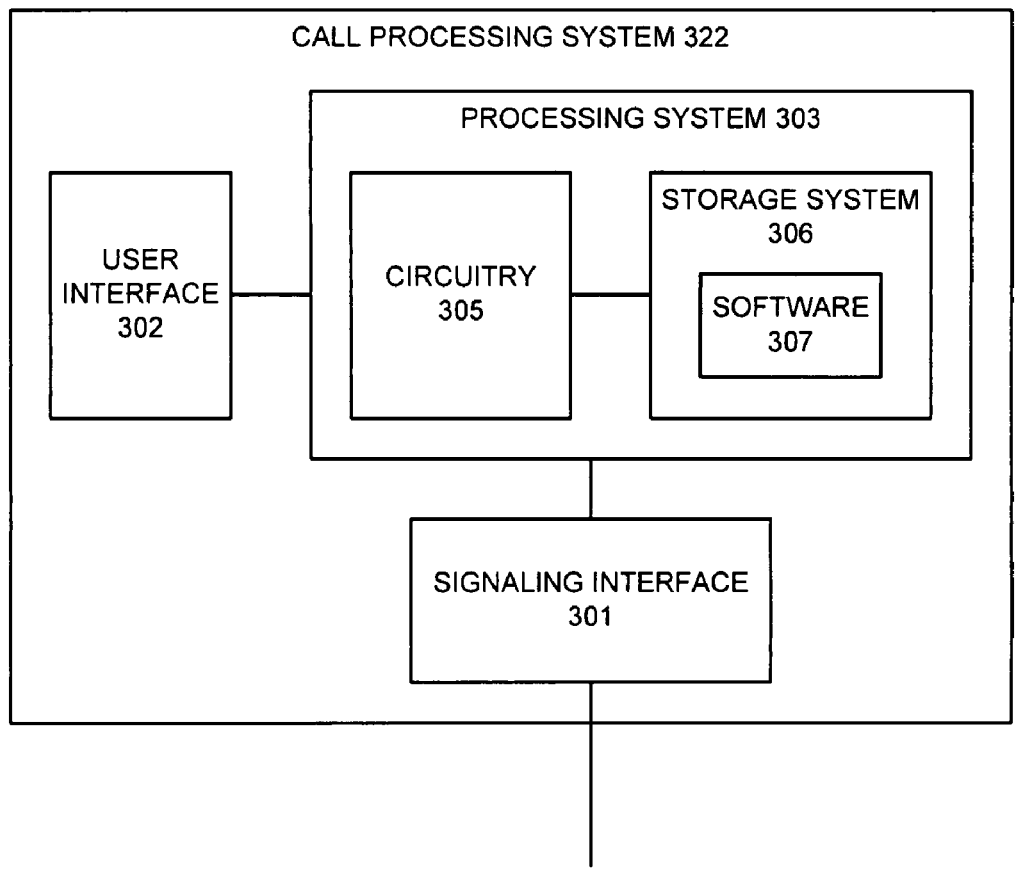
FIG. 3 illustrates a call processing system in the tandem media communication network.

FIG. 3 illustrates call processing system 322. Call processing system 322 is an example of call processing system 122, although call processing system 122 could use other configurations. Call processing system 322 comprises signaling interface 301, user interface 302, and processing system 303. Processing system 303 is linked to communication interface 301 and user interface 302. Processing system 303 includes circuitry 305 and storage system 306 that stores operating software 307.

Signaling interface 301 comprises components that communicate over signaling links under the control of processing system 303. Signaling interface 301 comprises network cards, RF transceivers, processing circuitry and software, or some other communication devices. Signaling interface 301 may communicate over metallic, wireless, or optical links. Signaling interface 301 may use time division multiplex, microwave, internet protocol, optical networking, or some other communication format. Signaling interface 301 may use session initiation protocol, signaling system 7, an internet media protocol, or some other signaling protocol.

User interface 302 comprises components that interact with a user under the control of processing system 303. User interface 302 may include a keyboard, display screen, mouse, touch pad, or some other user input/output apparatus. User interface 302 may be omitted in some examples.

Circuitry 305 comprises microprocessor and other circuitry that retrieves and executes operating software 307 from storage system 306 to control signaling interface 301 and user interface 302. Storage system 306 comprises a disk drive, flash drive, memory circuitry, or some other memory devices. Operating software 307 comprises computer programs, firmware, or some other form of machine-readable processing instructions. Operating software 307 may include an operating system, utilities, drivers, network interfaces, applications, or some other type of software. The applications include call processing and data base applications. When executed by circuitry 305, operating software 307 directs processing system 303 to operate call processing system 322 as described herein. In particular, operating software 307 directs call processing system 303 to process signaling messages to transfer loss instructions.

The elements of call processing system 322 could be concentrated on a single platform or be distributed across multiple platforms. For example, call processing system 322 could be implemented within a single soft-switch or application server. In an alternative example, call processing system 322 could be implemented across several soft-switches and application servers or across several routers. Other examples are possible.

Figure 4:
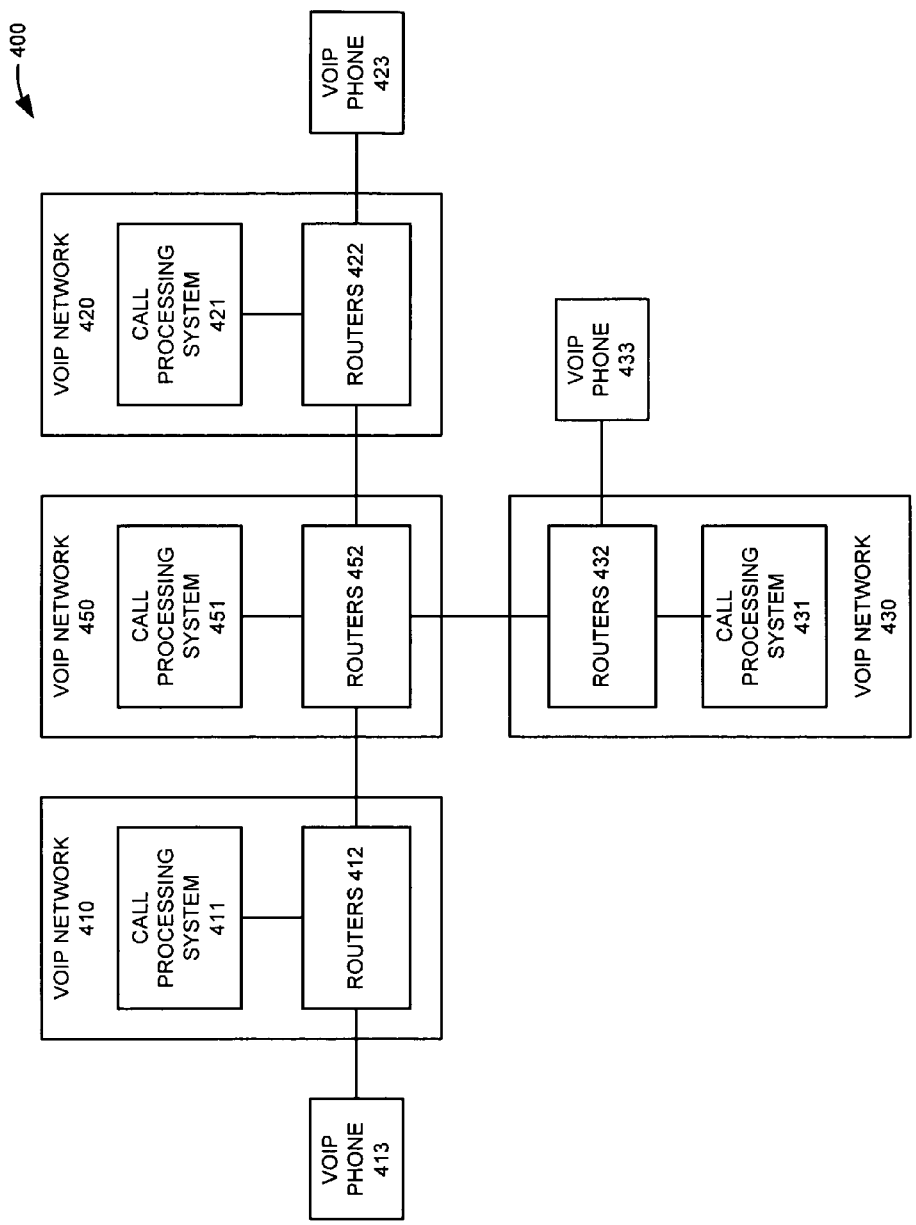
FIG. 4 illustrates a VOIP system.

FIG. 4 illustrates Voice Over Internet Protocol (VOIP) system 400. VOIP system 400 includes VOIP networks 410, 420, 430, and 450. VOIP system 400 includes VOIP phones 413, 423, and 433. VOIP network 410 includes call processing system 411 and routers 412. VOIP network 420 includes call processing system 421 and routers 422. VOIP network 430 includes call processing system 431 and routers 432. Tandem VOIP network 450 includes call processing system 451 and routers 432. Call processing system 451 comprises soft-switches, service control points, application servers, routers, gateways, or some other VOIP signaling processor— including combinations thereof.

In operation, VOIP phone 413 transfers a Session Initiation Protocol (SIP) invite message to call processing system 411 to request a voice call to VOIP phone 433. Call processing system 411 processes the SIP invite message to select tandem VOIP network 450 and transfers a SIP invite to call processing system 451. Call processing system 451 processes the SIP invite message to select VOIP network 430 and transfers a SIP invite to call processing system 431. Call processing system 431 processes the SIP invite message to select VOIP phone 433 and transfers a SIP invite to VOIP phone 433. In response to the SIP invite messaging, SIP acknowledgement messaging is transferred from VOIP phone 433 back through call processing systems 431, 451, and 411 to VOIP phone 413.

In response to receiving the SIP invite message, call processing system 451 processes VOIP numbers for VOIP phones 413 and 433 to determine a loss adjustment for the VOIP call and to select one of VOIP phones 413 and 433 to make the loss adjustment. This process is detailed below in FIG. 5. If VOIP phone 413 is selected to make the loss adjustment, call processing system 451 puts a loss instruction indicating the loss adjustment in the SIP acknowledgement messaging (or a subsequent SIP message) that is transferred to VOIP phone 413 through call processing system 411. If VOIP phone 433 is selected to make the loss adjustment, call processing system 451 puts a loss instruction indicating the loss adjustment in the SIP invite messaging (or a subsequent SIP message) that is transferred to VOIP phone 433 through call processing system 431.

The selected one of the VOIP phones 413 or 433 receives the loss instruction and responsively makes the loss adjustment for the voice call. VOIP phones 413 and 433 exchange digitized voice data in internet packets through routers 412, 432, and 452. To perform the loss adjustment, the selected one of the VOIP phones 413 or 433 controls its signal processing circuitry to adjust the decibels of loss applied to the amplified voice signal before it is transferred in the internet packets.

Figure 5:
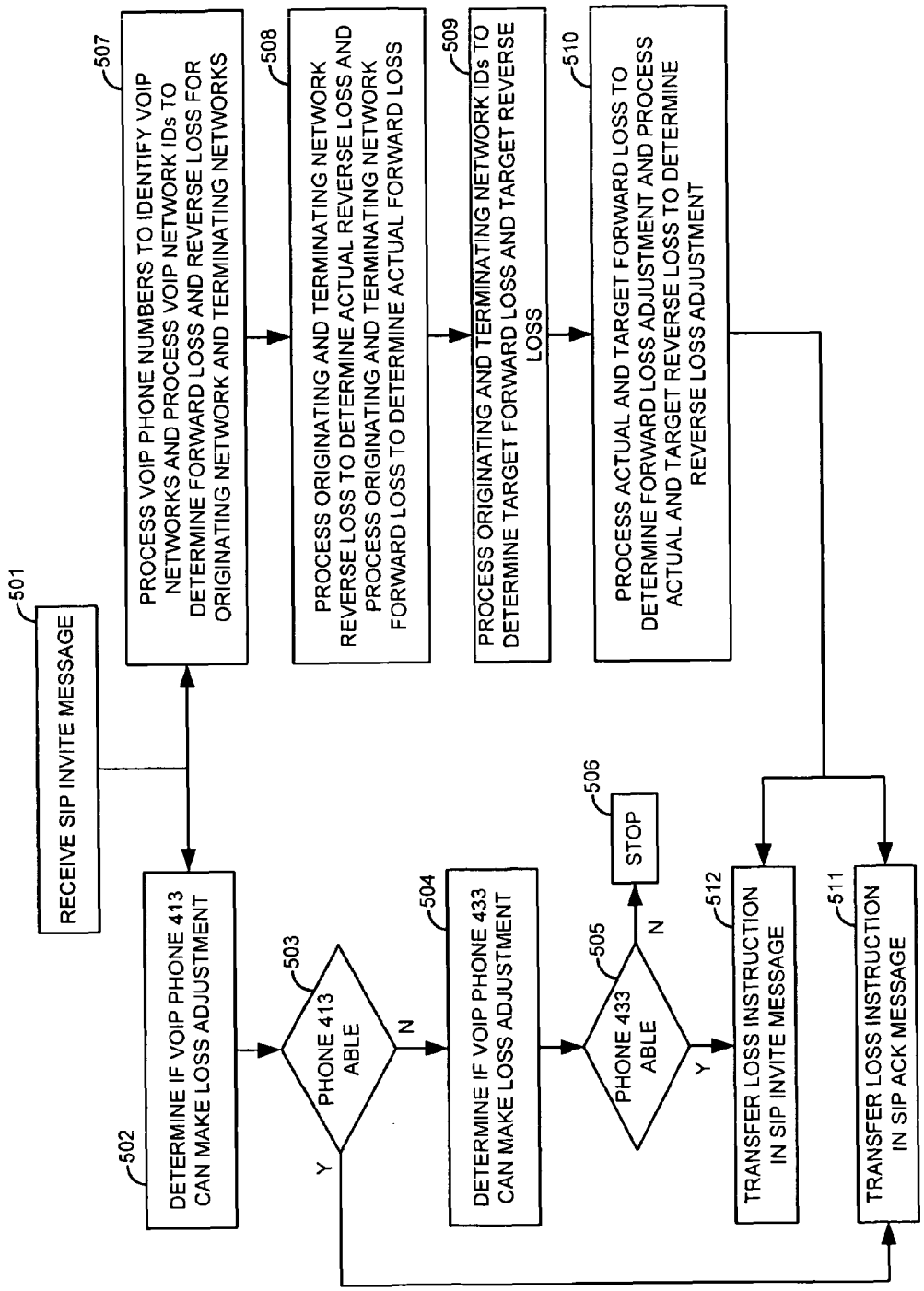
FIG. 5 illustrates the operation of the VOIP system.

FIG. 5 illustrates the operation of call processing system 451 in VOIP system 400. Call processing system 451 receives the SIP message for the call (501) and processes the VOIP number for VOIP phone 413 to determine if VOIP phone 413 can make the loss adjustment (502). VOIP phone 413 is selected to make the loss adjustment if it is able (503). If VOIP phone 413 is unable to make the loss adjustment (503), then call processing system 451 processes the VOIP number for VOIP phone 433 to determine if VOIP phone 433 can make the loss adjustment (504). VOIP phone 433 is selected to make the loss adjustment if VOIP phone 413 is unable and VOIP phone 433 is able (505). Otherwise, the process stops (506).

In response to receiving the SIP message (501), call processing system 451 processes the VOIP number for VOIP phone 413 to determine the identity of VOIP network 410 (507). Call processing system 451 processes the VOIP number for VOIP phone 433 to determine the identity of VOIP network 430 (507). In the alternative, other information from the SIP invite message could be used to identify VOIP networks 410 and 430.

Call processing system 451 processes the ID for VOIP network 410 to determine originating network forward loss and originating network reverse loss (507). Call processing system 451 processes the ID for VOIP network 430 to determine terminating network forward loss and terminating network reverse loss (507). Forward loss is the loss applied by the VOIP network to the voice call in the forward direction from VOIP phone 413 to VOIP phone 433. Reverse loss is the loss applied by the VOIP network to the voice call in the reverse direction from VOIP phone 433 to VOIP phone 413. Call processing system 451 sums the originating network forward loss and the terminating network forward loss to determine actual forward loss (508). Call processing system 451 sums the originating network reverse loss and the terminating network reverse loss to determine actual reverse loss (508).

Call processing system 451 processes the IDs for VOIP networks 410 and 430 to determine a target forward loss and a target reverse loss (509). The target forward loss is a desired amount of loss applied to the voice call by the VOIP networks in the forward direction. The target reverse loss is a desired amount of loss applied to the voice call by the VOIP networks in the reverse direction. The target losses are typically selected to balance the total loss on the call between the forward and reverse directions. This translation of IDs into target losses could be accomplished through a pre-configured table that is entered with the IDs to yield the desired target losses. Call processing system 451 determines a forward loss adjustment based on the difference between the actual forward loss and the target forward loss (510). Call processing system 451 determines a reverse loss adjustment based on the difference between the actual reverse loss and the target reverse loss (510). Either the forward or reverse loss adjustment may be zero or may be omitted altogether.

If VOIP phone 413 was selected to make the loss adjustment (503), then call processing system 451 indicates the forward loss adjustment and/or the reverse loss adjustment in the SIP acknowledgement message transferred back toward VOIP phone 413 (511). If VOIP phone 433 was selected to make the loss adjustment (505), then call processing system 451 indicates the forward loss adjustment and/or the reverse loss adjustment in the SIP invite message transferred toward VOIP phone 433 (512).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a tandem network wherein an originating device coupled to an originating network requests a media call to a terminating device coupled to a terminating network, the method comprising:
    in the tandem network, receiving a signaling message for the media call transferred by the originating network and retrieving a first number for the originating device and a second number for the terminating device from the signaling message;
    processing the first number and the second number to determine a loss adjustment for the media call and to select one of the originating device and the terminating device to make the loss adjustment by processing at least the first number to determine if the originating device can make the loss adjustment and processing at least the second number to determine if the terminating device can make the loss adjustment; and
    transferring a loss instruction indicating the loss adjustment to one of the originating network and the terminating network for delivery to the selected device, wherein the selected device receives the loss instruction and responsively makes the loss adjustment for the media call.

2. The method of claim 1 wherein processing the first number and the second number to determine the loss adjustment for the media call comprises processing the first number to determine an originating network ID and processing the second number to identify a terminating network ID.

3. The method of claim 2 wherein processing the first number and the second number to determine the loss adjustment for the media call comprises processing the originating network ID to determine originating network forward loss and originating network reverse loss and processing the terminating network ID to determine terminating network forward loss and terminating network reverse loss.

4. The method of claim 3 wherein processing the first number and the second number to determine the loss adjustment for the media call comprises processing the originating network forward loss and the terminating network forward loss to determine actual forward loss and processing the originating network reverse loss and the terminating network reverse loss to determine actual reverse loss.

5. The method of claim 4 wherein processing the first number and the second number to determine the loss adjustment for the media call comprises processing the originating network identity and the terminating network identity to determine target forward loss and target reverse loss.

6. The method of claim 5 wherein processing the first number and the second number to determine the loss adjustment for the media call comprises processing the actual forward loss and the target forward loss to determine a forward loss adjustment and processing the actual reverse loss and the target reverse loss to determine a reverse loss adjustment.

7. The method of claim 1 wherein processing the first number and the second number to select one of the originating device and the terminating device to make the loss adjustment comprises selecting the originating device if the originating device can make the loss adjustment and selecting the terminating device if the originating device cannot make the loss adjustment and the terminating device can make the loss adjustment.

8. The method of claim 1 wherein:
the originating network comprises a first Voice Over Internet Protocol (VOIP) network, the tandem network comprises a second VOIP network, and the terminating network comprises a third VOIP network;
receiving the signaling message comprises receiving a Session Initiation Protocol (SIP) invite message; and
transferring the loss instruction comprises transferring a SIP acknowledgement message to the originating network.

9. The method of claim 1 wherein:
the originating network comprises a first Voice Over Internet Protocol (VOIP) network, the tandem network comprises a second VOIP network, and the terminating network comprises a third VOIP network;
receiving the signaling message comprises receiving a first Session Initiation Protocol (SIP) invite message; and
transferring the loss instruction comprises transferring a second SIP invite message to the terminating network.

10. A tandem network wherein an originating device coupled to an originating network requests a media call to a terminating device coupled to a terminating network, the tandem network comprising:
a call processing system configured to receive a signaling message for the media call transferred by the originating network and process the signaling message to route the call from the originating network to the terminating network;
a routing system configured to transfer media communications for the media call between the originating network and the terminating network; and
the call processing system further configured to process a first number for the originating device and a second number for the terminating device to determine a loss adjustment for the media call and select one of the originating device and the terminating device to make the loss adjustment by processing at least the first number to determine if the originating device can make the loss adjustment and processing at least the second number to determine if the terminating device can make the loss adjustment, and transfer a loss instruction indicating the loss adjustment to one of the originating network and the terminating network for delivery to the selected device, wherein the selected device receives the loss instruction and responsively makes the loss adjustment for the media call.

11. The tandem network of claim 10 wherein the call processing system is configured to process the first number to determine an originating network ID and process the second number to identify a terminating network ID.

12. The tandem network of claim 11 wherein the call processing system is configured to process the originating network ID to determine originating network forward loss and originating network reverse loss and process the terminating network ID to determine terminating network forward loss and terminating network reverse loss.

13. The tandem network of claim 12 wherein the call processing system is configured to process the originating network forward loss and the terminating network forward loss to determine actual forward loss and process the originating network reverse loss and the terminating network reverse loss to determine actual reverse loss.

14. The tandem network of claim 13 wherein the call processing system is configured to process the originating network identity and the terminating network identity to determine target forward loss and target reverse loss.

15. The tandem network of claim 14 wherein the call processing system is configured to process the actual forward loss and the target forward loss to determine a forward loss adjustment and process the actual reverse loss and the target reverse loss to determine a reverse loss adjustment.

16. The tandem network of claim 10 wherein the call processing system is configured to process select the originating device to make the loss adjustment if the originating device can make the loss adjustment and to select the terminating device to make the loss adjustment if the originating device cannot make the loss adjustment and the terminating device can make the loss adjustment.

17. The tandem network of claim 10 wherein:
the originating network comprises a first Voice Over Internet Protocol (VOIP) network, the tandem network comprises a second VOIP network, and the terminating network comprises a third VOIP network;
the signaling message comprises a Session Initiation Protocol (SIP) invite message transferred by the originating network; and
the loss instruction is included in a SIP acknowledgement message transferred to the originating network.

18. The tandem network of claim 10 wherein:
the originating network comprises a first Voice Over Internet Protocol (VOIP) network, the tandem network comprises a second VOIP network, and the terminating network comprises a third VOIP network;
the signaling message comprises a first Session Initiation Protocol (SIP) invite message transferred by the originating network; and
the loss instruction is included in a second SIP invite message transferred to the terminating network.

* * * * *